US009539562B2

(12) United States Patent
Bentele et al.

(10) Patent No.: US 9,539,562 B2
(45) Date of Patent: Jan. 10, 2017

(54) VANADIUM-FREE DIESEL OXIDATION CATALYST AND METHOD FOR ITS PRODUCTION

(75) Inventors: Andreas Bentele, Bad Aibling (DE); Klaus Wanninger, Kolbermoor (DE); Gerd Maletz, Bad Aibling (DE); Martin Schneider, Pfinztal (DE)

(73) Assignee: CLARIANT PRODUKTE (DEUTSCHLAND) GMBH, Frankfurt am Main (DE)

( * ) Notice: Subject to any disclaimer, the term of this patent is extended or adjusted under 35 U.S.C. 154(b) by 0 days.

(21) Appl. No.: 13/146,492

(22) PCT Filed: Jan. 27, 2010

(86) PCT No.: PCT/EP2010/000486
§ 371 (c)(1),
(2), (4) Date: Oct. 10, 2011

(87) PCT Pub. No.: WO2010/086148
PCT Pub. Date: Aug. 5, 2010

(65) Prior Publication Data

US 2012/0020843 A1 Jan. 26, 2012

(30) Foreign Application Priority Data

Jan. 28, 2009 (DE) ........................ 10 2009 006 403

(51) Int. Cl.
*B01J 23/42* (2006.01)
*B01D 53/94* (2006.01)
(Continued)

(52) U.S. Cl.
CPC .............. *B01J 23/42* (2013.01); *B01D 53/944* (2013.01); *B01J 23/63* (2013.01); *B01J 37/0203* (2013.01);
(Continued)

(58) Field of Classification Search
CPC . B01D 47/06; B01D 53/501; F01N 2013/026; F01N 3/2846; F01N 3/2882
See application file for complete search history.

(56) References Cited

U.S. PATENT DOCUMENTS 4,018,706 A * 4/1977 Inoue et al. .................. 502/248
4,378,307 A 3/1983 Brunelle et al.
(Continued)

FOREIGN PATENT DOCUMENTS

DE 28 56 030 A2 6/1980
DE 4 207 961 A1 9/1993
(Continued)

OTHER PUBLICATIONS

Verdier, S., Rohad, E., Larcher, O., Harle, V. et al., "Innovative Materials for Diesel Oxidation Catalysts, with High Durability and Early Light-Off," SAE Technical Paper 2005-01-0476 (2005).
(Continued)

*Primary Examiner* — Melissa Swain
(74) *Attorney, Agent, or Firm* — Florek & Endres PLLC

(57) ABSTRACT

The invention relates to a method for producing a catalytic composition, wherein the catalytic composition has a high activity and selectivity with regard to the oxidation of CO and a reduced activity with regard to the oxidation of NO. The invention also relates to the catalyst produced using the method according to the invention. Finally, the invention is directed towards an exhaust-gas cleaning system which comprises the catalyst according to the invention.

14 Claims, 3 Drawing Sheets

(51) Int. Cl.

| | |
|---|---|
| ***B01J 23/63*** | (2006.01) |
| ***B01J 37/02*** | (2006.01) |
| ***B01J 37/08*** | (2006.01) |
| ***B01J 37/16*** | (2006.01) |
| ***F01N 13/12*** | (2010.01) |

(52) U.S. Cl.

CPC ......... *B01J 37/0228* (2013.01); *B01J 37/0248* (2013.01); *B01J 37/08* (2013.01); *B01J 37/16* (2013.01); *F01N 13/12* (2013.01); *B01D 2255/1021* (2013.01); *B01D 2255/2092* (2013.01); *B01D 2255/20707* (2013.01); *B01D 2255/20715* (2013.01); *B01D 2255/30* (2013.01); *B01D 2255/40* (2013.01); *B01D 2255/50* (2013.01); *B01D 2258/012* (2013.01)

(56) References Cited

U.S. PATENT DOCUMENTS

| | | | | |
|---|---|---|---|---|
| 6,492,298 | B1 * | 12/2002 | Sobukawa et al. | 502/325 |
| 2003/0140620 | A1 | 7/2003 | Shigapov et al. | |
| 2004/0082461 | A1 | 4/2004 | Remans et al. | |
| 2004/0166036 | A1 * | 8/2004 | Chen et al. | 422/180 |
| 2008/0029396 | A1 * | 2/2008 | Shirakura et al. | 205/60 |
| 2008/0124264 | A1 | 5/2008 | Ikeda et al. | |
| 2008/0125308 | A1 * | 5/2008 | Fujdala et al. | 502/74 |
| 2008/0207437 | A1 | 8/2008 | Mabilon et al. | |
| 2009/0239739 | A1 * | 9/2009 | Yasuda et al. | 502/241 |
| 2010/0300077 | A1 * | 12/2010 | Eckhoff | 60/295 |

FOREIGN PATENT DOCUMENTS

| | | | |
|---|---|---|---|
| DE | 102007023979 | A1 | 11/2008 |
| EP | 0 049 489 | A1 | 4/1982 |
| EP | 1 040 870 | A2 | 3/2000 |
| EP | 1 121 979 | A1 | 8/2001 |
| EP | 1 287 876 | A2 | 8/2002 |
| EP | 0 706 817 | B1 | 2/2003 |
| EP | 0 800 856 | B1 | 7/2003 |
| EP | 1 129 764 | B1 | 10/2005 |
| EP | 1 820 561 | A1 | 8/2007 |
| GB | 2 443 895 | A | 5/2008 |
| JP | 2003-265958 | | 9/2003 |
| JP | 2005-095763 | | 4/2005 |
| WO | WO 9933549 | A1 | 7/1999 |

OTHER PUBLICATIONS

Goebel, Matthias, "International Search Report and Written Opinion of the International Search Authority, or the Declaration for International Application No. PCT/EP2010/000486," Jun. 23, 2010—see pp. 29-34.

* cited by examiner

VANADIUM-FREE DIESEL OXIDATION CATALYST AND METHOD FOR ITS PRODUCTION

FIELD OF THE INVENTION

The invention relates to a method for producing a catalyst, wherein the catalyst has a high activity and selectivity with regard to the oxidation of CO and a reduced activity with regard to the oxidation of NO. The invention also relates to the catalyst produced using the method according to the invention. Finally, the invention is directed towards an exhaust-gas cleaning system which comprises the catalyst component containing the catalyst according to the invention.

BACKGROUND OF THE INVENTION

In the early days of exhaust-gas cleaning of combustion engines, only the exhaust gases from petrol engines were cleaned with three-way catalysts (TWC). The nitrogen oxides are reduced with the reductive hydrocarbons (HC) and carbon monoxide (CO). For this, the petrol engine is always driven under approximately stoichiometric conditions ($\lambda$=1). This cannot always be guaranteed precisely in this way, with the result that the conditions in the exhaust gas always fluctuate around $\lambda$=1. In other words, the catalyst is exposed alternately to an oxidative or a reductive gas atmosphere.

For about 15 years, attempts have also been made to aftertreat the exhaust gases from diesel engines with catalysts. The exhaust gas from diesel engines contains carbon monoxide, unburnt hydrocarbons, nitrogen oxides and soot particles as air pollutants. The unburnt hydrocarbons comprise paraffins, olefins, aldehydes and aromatics. Unlike the petrol engine, the diesel engine always runs with an excess of oxygen and thus the catalyst is never exposed to reductive conditions. This has the following consequences:

1. The oxygen storage capacity of the catalyst material does not play the same role as with the TWC.
2. The noble metal particles are not always reduced again to metal of oxidation state 0.
3. The nitrogen oxides cannot be fully reduced when there is an excess of oxygen with the hydrocarbons (HC) present in the exhaust gas and CO.
4. The hydrocarbons and CO can be oxidized both with oxygen and with $NO_x$.

Diesel exhaust gases are much colder than exhaust gases from petrol engines and contain oxygen in a concentration between 3 and 10 vol.-%, which is why the catalytic activity of the catalyst on average is not always sufficient to oxidize HC and CO. In partial-load operation, the exhaust-gas temperature of a diesel engine lies in the range between 100 and 250° C. and only in full-load operation does it reach a maximum temperature between 550 and 650° C. In contrast, the exhaust-gas temperature of a petrol engine lies between 400 and 450° C. in partial-load operation and, in full load, can rise to up to 1000° C. It is therefore an aim to achieve as low as possible a CO light-off temperature.

In past years, diesel particle filters (DPF) have increasingly been introduced onto the market. These are normally fitted downstream of the DOCS. Soot is collected and oxidized in the DPF. The oxidation of soot is much more possible with $NO_2$ than with oxygen. Thus, the more $NO_2$ is contained in the gas stream after the DOC, the more soot continuously reacts. Thus, there has been a tendency in past years to oxidize as much NO to $NO_2$ as possible in the DOC. But $NO_2$ is an even more toxic gas than NO, with the result that this shift towards increased nitrogen oxide emissions manifests itself in a very negative way. An increasing $NO_2$ concentration due to DOC is also already detectable in cities. Thus, the trend is returning to a limiting of the oxidation of NO to $NO_2$.

Markedly reduced emissions of nitrogen oxides have thus also been prescribed for the Euro VI standard. It will be possible to achieve these either only by means of $NO_R$-trap catalysts or by means of a selective catalytic reduction by means of ammonia.

SCR (selective catalytic reduction) denotes the selective catalytic reduction of nitrogen oxides from exhaust gases of combustion engines and also power stations. Only the nitrogen oxides NO and $NO_2$ (called $NO_x$ in general) are selectively reduced with an SCR catalyst, wherein $NH_3$ (ammonia) is usually admixed for the reaction. The closer the $NO/NO_2$ ratio is to 1:1, the more efficiently such an SCR reaction runs, thus a substantial oxidation of NO to $NO_2$ is necessary for this. Only the harmless substances water and nitrogen form as reaction product in the SCR reaction.

The transportation of ammonia in compressed-gas bottles is a safety risk for use in motor vehicles. Therefore precursor compounds of ammonia which are broken down in the exhaust-gas system of the vehicles accompanied by the formation of ammonia are customarily used. For example the use of AdBlue®, which is an approximately 32.5% eutectic solution of urea in water, is known in this connection. Other ammonia sources are for example ammonium carbamate, ammonium formate or urea pellets.

However, a problem is that such an SCR catalyst is difficult to retrofit, or retrofitting is associated with extremely high costs, as many additional components and control systems are necessary. Accordingly, particle filters are today predominantly retrofitted in diesel vehicles without downstream SCR catalyst, wherein excess $NO_2$ that is not required for the particle oxidation leaves the exhaust-gas system and is introduced into the environment. It would thus be advantageous to be able to set the quantity of $NO_2$ produced more precisely.

The oxidation of NO to $NO_2$ takes place in an upstream oxidation catalyst which is thus necessary for an optimum degree of efficiency of the DPF.

The basis of the catalytic exhaust-gas cleaning in a diesel engine is thus clearly the upstream oxidation catalyst which is to have an efficient oxidation action for CO and HC. This is achieved for example by reducing the CO light-off temperature. However, the NO oxidation tendency is to be reduced in order to emit as little $NO_2$ as possible. On the other hand, as far as possible, so much $NO_2$ is to form that a particle filter (without subsequent SCR catalyst) is provided with enough $NO_2$.

It is known in the state of the art (see for example U.S. Pat. No. 5,157,007 A1) that catalysts with $TiO_2$ as support material and $V_2O_5$ as catalytically active component have a lower activity with regard to the oxidation of NO to $NO_2$. However, vanadium is toxic and can be introduced into the environment via the exhaust-gas system. In addition, vanadium also reduces the activity vis-à-vis the CO oxidation and thus is not desired for this reason also.

In the publication SAE 2005/01-0476 (Rhodia), it is clear that above all support materials with smaller interactions with Pt(II), e.g. aluminium oxide and zirconium oxide, make possible very low light-off temperatures for the oxidation of CO. Because of the larger BET surface area of aluminium, aluminium oxide is preferably used for DOC applications.

One way of reducing the light-off temperature for CO as much as possible can be found in the patent application EP 706817 A1 from Umicore. EP 706817 A1 describes a DOC catalyst with Pt on an Al/Si mixed oxide (in the best case 5% Si).

The further development using an $H^+$ and $Na^+$ zeolite is disclosed in EP 800856 B1, where light-off temperatures of approximately 150° C. for CO are already achieved.

A further improvement is described in EP 1129764 B1, where very finely distributed Pt particles with an average oxidation state of the Pt<2.5 form by a calcining by means of injection into a flame. It is to be borne in mind that combustion exhaust gases can contain a wide variety of components, such as CO, nitrogen oxides and residual hydrocarbons. In addition, combustion exhaust gases can also contain different quantities of oxygen depending on the guidance of the combustion. The gas mixture can thus be reductive or oxidative.

Although the injection of a platinum precursor into a flame results in a catalyst that has a good activity with regard to a CO oxidation, the oxidation activity with regard to the oxidation of NO to $NO_2$ cannot be controlled with this method. Thus, there is still a need for catalysts with as low as possible a light-off temperature for CO and, at the same time, a low activity and selectivity for the oxidation of NO to $NO_2$.

The object of the present invention was therefore to provide such catalysts.

SUMMARY OF THE INVENTION

The object is achieved by a method for producing a catalyst, comprising the steps:

(a) impregnating a support material with a platinum compound, (b) drying the impregnated support material below the decomposition point of the platinum compound, (c) calcining the impregnated support material in a gas stream which contains CO and an inert gas.

$N_2$, He, Ne or Ar is preferably used as inert gas, particularly preferably $N_2$.

The gas stream preferably contains 0.5 to 3 vol.-% CO, particularly preferably 1 vol.-% CO, relative to the total volume of the gas stream. Accordingly, the gas stream preferably contains 97 to 99.5 vol.-% inert gas, preferably $N_2$, particularly preferably 99 vol.-% inert gas, relative to the total volume of the gas stream.

It was surprisingly found that heating a support material impregnated with a platinum compound in a gas stream that predominantly contains inert gas, in particular $N_2$, and too small proportions of CO results in a catalyst that displays a high activity for the oxidation of CO to $CO_2$, but at the same time has a very low activity and selectivity with regard to the oxidation of NO to $NO_2$. This behaviour is very desirable in particular for a use as diesel oxidation catalyst (DOC) with subsequent, in particular downstream, DPF (diesel particle filter), without SCR catalyst.

Particularly preferably, the calcining (first calcining) of the impregnated support material takes place heating within 10 minutes, particularly preferably within 6 minutes and quite particularly preferably within 5 minutes. The calcining temperature is preferably 400° C. to 650° C., particularly preferably 450° C. to 600° C. A further (second) calcining then takes place, optionally after a short pause, over a period of 10-40 min, preferably 20 min, under the same conditions.

According to the invention, it is advantageous if the dried, impregnated support material is present as a thin layer or finely distributed. This can guarantee that the thermal energy can be optimally utilized during the calcining and a complete calcining during the short time period of less than 10 minutes is made possible.

DETAILED DESCRIPTION OF THE PREFERRED EMBODIMENTS

Figure 1:
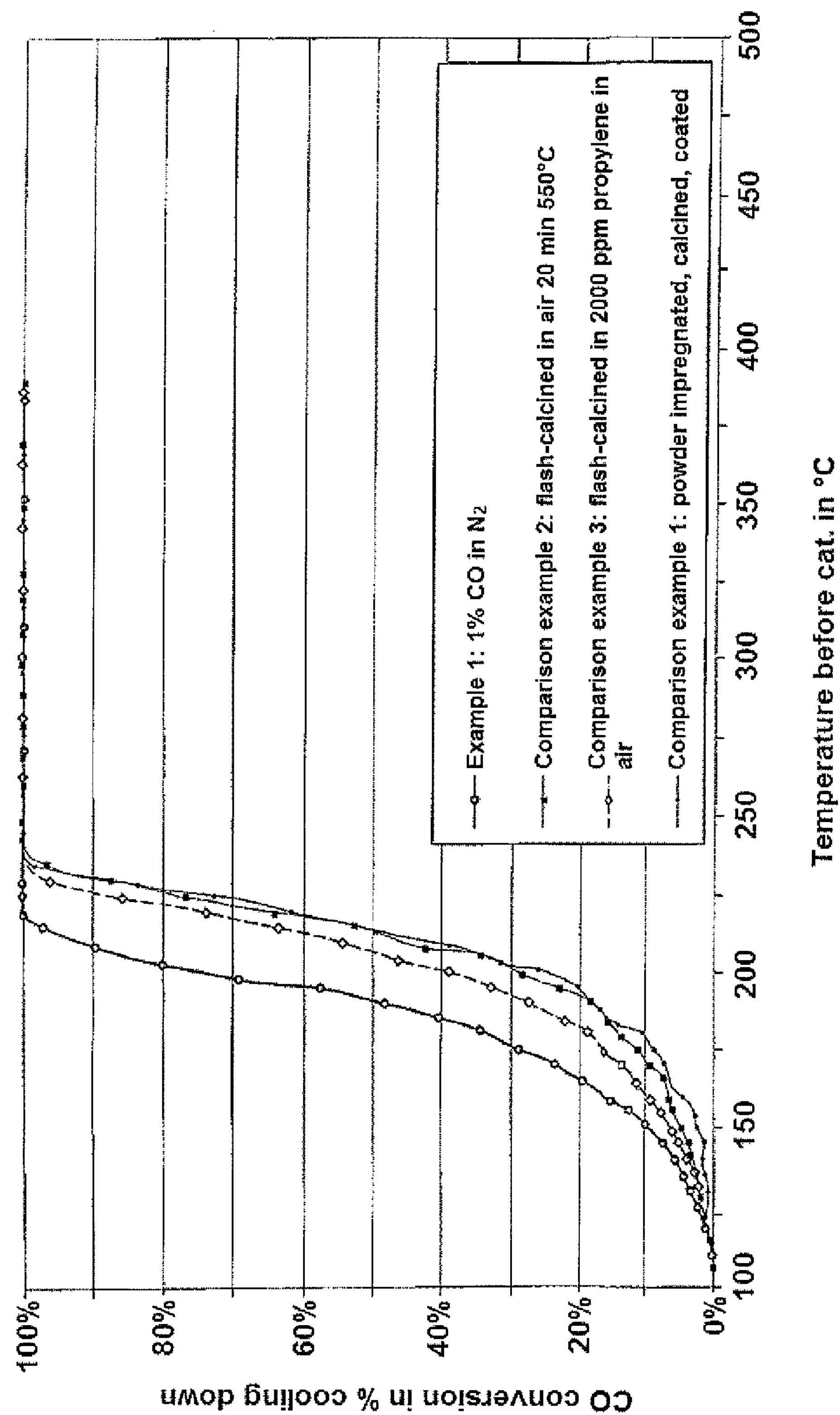
FIG. 1 is a graph comparing the CO conversions from the catalysts used.

In a preferred embodiment of the invention, the dried, impregnated support material is therefore applied to a catalyst support body prior to the calcining. Particularly preferably, the dried, impregnated support material is applied to the catalyst support body in the form of a washcoat coating and then dried again below the decomposition temperature of the platinum compound.

The drying of the impregnated support material takes place according to the present invention preferably at temperatures of from 60° C. to 100° C., more preferably from 70 to 90° C., most preferably at about 80° C. However, the temperature depends on the platinum compound used, as these can have different decomposition points and thus the temperature must be adapted accordingly. The drying preferably takes place under reduced pressure, particularly preferably under fine vacuum.

For the impregnating, the noble metal (Pt) is usually present as salt solution, for example as chloride, nitrate or sulphate. Normally, all customary salts and complex salts of platinum are suitable, e.g. hexachloroplatinic acid, tetrachloroplatinic acid, dinitro diamine platinate (II), tetraamine platinum (II) chloride, ammonium tetrachloroplatinate (II), ammonium hexachloroplatinate (IV), dichloro(ethylenediamine) platinum, tetraamine platinum (II) nitrate, tetraamine platinum (II) hydroxide, methylethanolamine platinum (II) hydroxide, platinum nitrate, ethanolammonium hexahydroxoplatinate (platinum ethanolamine, PtEA) and similar. Ethanolammonium hexahydroxoplatinate (PtEA) is particularly preferred.

A metal oxide or metal mixed oxide is preferably used as support material. The metal oxide or metal mixed oxide is preferably selected from the group consisting of aluminium oxide, silicon oxide, aluminosilicate, zirconium oxide, titanium oxide, Al/Si mixed oxide or combinations thereof.

The necessary coating techniques for coating a catalyst support body are known to a person skilled in the art. Thus, e.g. the impregnated and dried metal oxide or mixed oxide is processed to an aqueous coating dispersion. This dispersion can be added as binder, e.g. silica sol. The viscosity of the dispersion can be set by the appropriate additives, with the result that it becomes possible to apply the necessary quantity of coating to the walls of the flow channels in a single work step. If this is not possible, the coating can be repeated several times, wherein each freshly applied coating is fixed by an intermediate drying. The finished coating is then calcined at the temperatures given above within the temperature range in less than 10 min, preferably less than 6 min, particularly preferably less than 5 min (first calcining). A second calcining step then takes place, optionally after a short pause, over a period of 10-40 min, preferably 20 min, under the same conditions.

For the exhaust-gas cleaning of diesel engines, coating quantities of from 50 to 500 g/l volume of the catalyst support body are advantageous. The catalyst component is preferably matched such that the catalytically active components are present in the metal oxide in a concentration of from approximately 0.01 to 7 g/l, preferably 2-4 g/l.

A metallic or ceramic monolith, a non-woven or metal foam can be used as catalyst support body. Other catalyst shaped bodies or catalyst support bodies known in the state of the art are also suitable according to the invention. A metallic or ceramic monolith that has a plurality of parallel passage openings which are provided with the washcoat coating is particularly preferred. With this, a uniform and in particular thin application of the washcoat suspension can be guaranteed, which thus supports the calcining.

Metallic honeycomb bodies are often formed from sheet metals or metal foils. The honeycomb bodies are produced for example by alternating arrangement of layers of structured sheets or foils. Preferably, these arrangements consist of one layer of a smooth sheet alternating with a corrugated sheet, wherein the corrugation can be formed for example sinusoidal, trapezoidal, omega-shaped or zigzag-shaped. Suitable metallic honeycomb bodies and methods for their production are described for example in EP 0 049 489 A1 or DE 28 56 030 A1.

In the field of catalyst support bodies, metallic honeycomb bodies have the advantage that they heat up more quickly and thus catalyst support bodies based on metallic substrates normally display a better response behaviour in cold-start conditions.

The honeycomb body preferably has a cell density of from 30 to 1500 cpsi, particularly preferably from 200 to 600 cpsi, in particular 400 cpsi.

The catalyst support body to which the catalyst according to the invention can be applied can be formed from any metal or a metal alloy and be produced e.g. by extrusion or by coiling or stacking or folding of metal foils. In the field of exhaust-gas cleaning, temperature-resistant alloys with the main constituents iron, chromium and aluminium are known. Monolithic catalyst support bodies that can be freely flowed through with or without internal leading edges for the agitation of the exhaust gas or metal foams which have a large internal surface area and to which the catalyst according to the invention adheres very well are preferred for the catalyst according to the invention. However, catalyst support bodies with slits, holes, perforations and impressions in the metal foil can also be used.

In the same way, catalyst support bodies made of ceramic material can be used. Preferably, the ceramic material is an inert material with a small surface area, such as cordierite, mullite or $\alpha$-aluminium oxide. However, the catalyst support used can also consist of support material with a large surface area, such as $\gamma$-aluminium oxide.

A metal foam, for example a metallic open-pored foam material, can also be used as catalyst support body. Within the framework of the present invention, by the term "metallic open-pored foam material" is meant a foam material made of any metal or of any alloy which can optionally also contain additives and which has a plurality of pores which are connected to each other by conduit, with the result that for example a gas can be conducted through the foam material.

Metallic open-pored foam materials have a very low density because of the pores and cavities, but have a substantial stiffness and strength. The production of metal foams takes place for example by means of a metal powder and a metal hydride. Both powders are normally admixed together and then compacted to a shaped material by hot pressing or extrusion. The shaped material is then heated to a temperature above the melting point of the metals. The metal hydride releases hydrogen gas and the mixture foams.

However, there are also still other possibilities for producing metal foams, for example by blowing gas into a metal melt which has previously been made foamable by adding solid constituents. For aluminium alloys for example, 10 to 20 vol.-% silicon carbide or aluminium oxide is added for the stabilization. In addition, open-pored metallic foam structures with a pore diameter of from 10 ppi to approximately 50 ppi can be produced by special precision casting techniques.

A further subject of the invention is a catalyst which can be obtained using the method according to the invention. The catalyst is characterized by a very good activity and a selective oxidation potential for an oxidation of CO (also HC) and a low activity and selectivity for an oxidation of NO.

The catalyst can accordingly be used as oxidation catalyst. In particular, the oxidation catalyst is to be used for the selective oxidation of CO (and HC).

Preferably, the catalyst is present as coating on a catalyst support body, preferably a metallic or ceramic monolithic shaped body, a non-woven or a metal foam.

The scope of the invention also includes a catalyst component which contains the catalyst according to the invention. The catalyst component is accordingly equipped with a housing in which the catalyst is located. The housing has an inlet and outlet opening for the exhaust gas to be treated.

The catalyst component (or the catalyst according to the invention) can be used as component in an exhaust-gas system. In a preferred embodiment of the invention, the catalyst component (the catalyst according to the invention) is fitted upstream of a diesel particle filter. Through the low activity of the catalyst for the oxidation of NO to $NO_2$, for example a particle filter is supplied with precisely enough $NO_2$ to oxidize soot particles, wherein $NO_2$ itself is reduced. Hardly any excess $NO_2$ which could be introduced into the environment is thereby left over. In this way, a downstream SCR catalyst can be dispensed with and costs can be reduced.

A subject of the invention is thus also an exhaust-gas system comprising a catalyst according to the invention and a diesel particle filter. The diesel particle filter is fitted downstream of the catalyst according to the invention. The exhaust-gas system is preferably free of an SCR catalyst.

Figure 2:
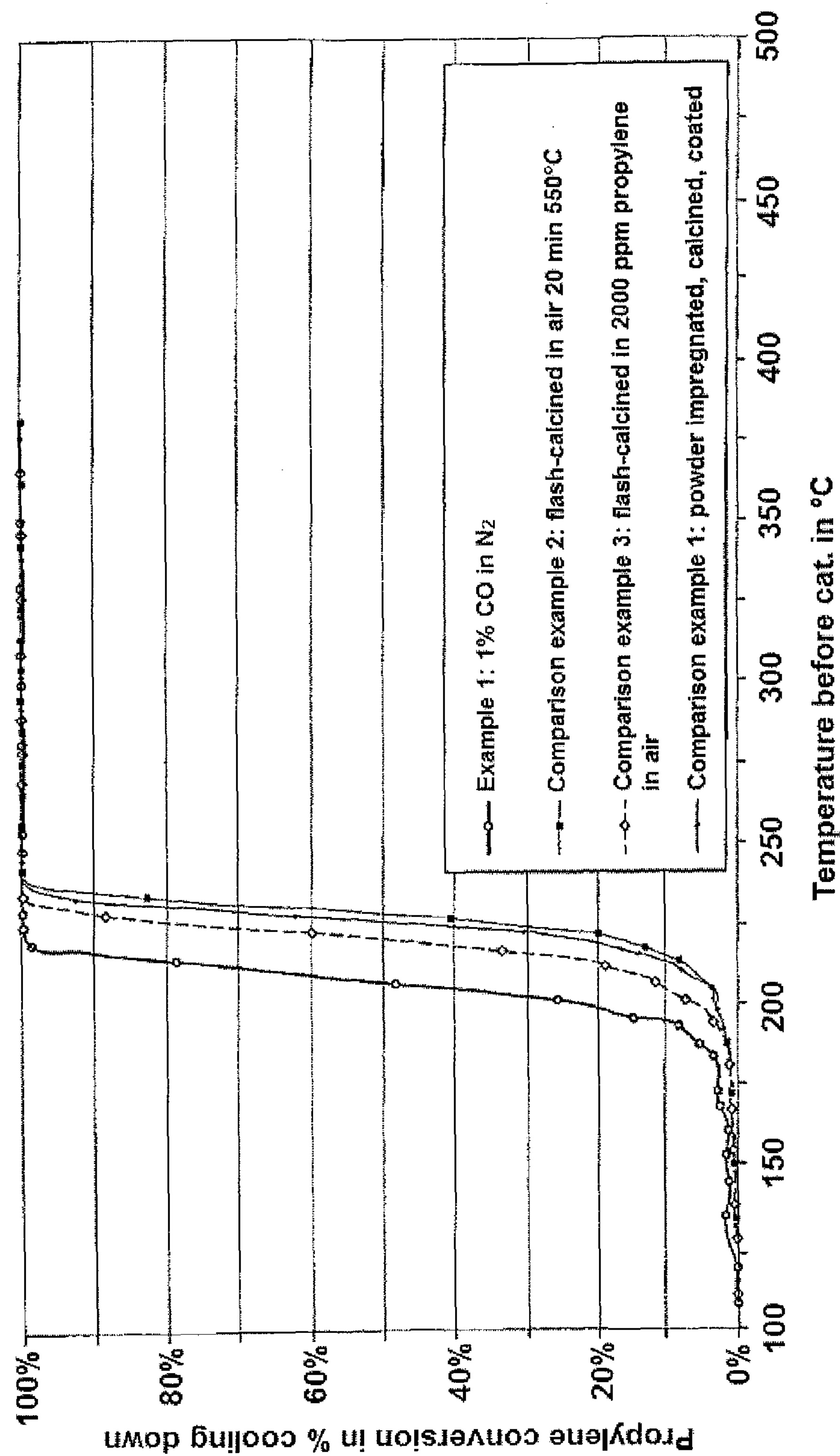
FIG. 2 is a graph comparing the propylene conversions from the catalysts used.
Figure 3:
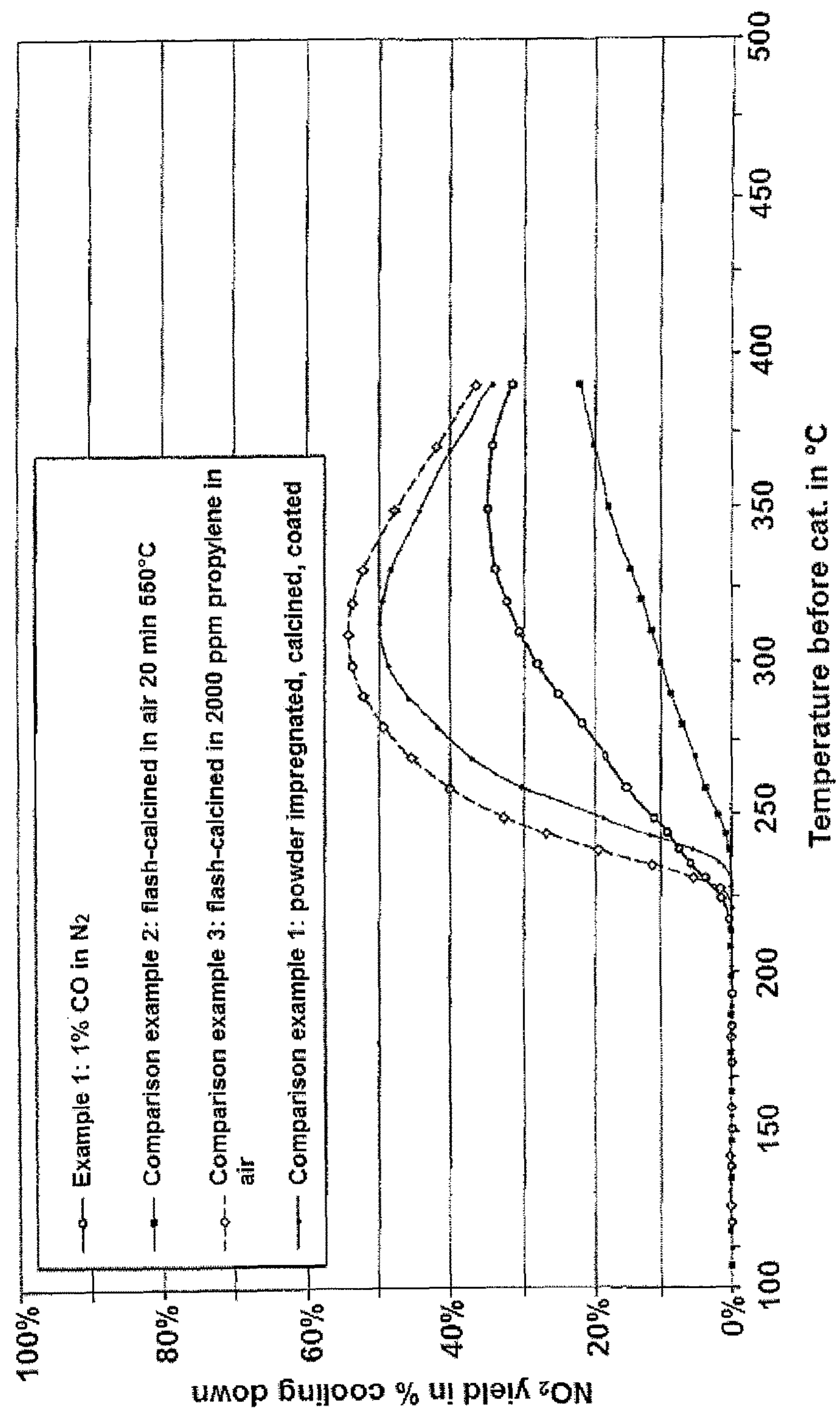
FIG. 3 is a graph comparing the yield of the oxidation of NO to $NO_2$ from the catalysts used.

The invention will now be described in more detail with the help of some embodiment examples which are however to be considered as not limiting the scope of the invention. Reference is made in addition to FIGS. 1 to 3.

EMBODIMENT EXAMPLES

Example 1

1. Impregnation

The water absorption of an aluminium oxide (Puralox SCF a-140 L3 from Sasol) stabilized with lanthanum was first determined by weighing the powder, slurrying in water, filtering and then weighing again while wet. It was 50.18 wt.-%.

In a planetary mixer, 110.4 g of a 13.59% solution of platinum ethanolamine (ethanolammonium hexahydroxoplatinate) was added slowly dropwise to 300 g of the dry Puralox powder accompanied by stirring. The powder was dried for 2 days at 80° C. in the vacuum drying cupboard, with the result that 5 wt.-% platinum would be contained on a completely dry powder.

2. Washcoat Production, Coating 500 g of this vacuum-dried powder (from 2 impregnation batches) was topped up with 2500 g water, de-agglomerated with an Ultra-Turrax stirrer and then milled with a bead mill (4000 rpm, 1.2-mm $ZrO_2$ beads).

400-cpsi cordierite honeycombs were coated with this washcoat by immersion and blowing. The honeycombs were then in each case dried again at 80° C. in the vacuum drying cupboard.

As a drying at 80° C. under vacuum does not necessarily take place completely, a loading of 60 g washcoat/l honeycomb was first produced by repeated coating. When the aluminium oxide is dry, this should correspond to a platinum loading of 3.0 g/l. A honeycomb from a series of identically coated and only vacuum-dried honeycombs was then calcined at 500° C. for 3 h and the platinum content analytically (pulping and ICP analysis) determined. This honeycomb (diameter 3 cm, length 8.8 cm) was coated with 3.68 g washcoat and weighed 33.4 g. With a Pt content of 5 wt.-%, the honeycomb should thus contain 0.55 wt.-% Pt when completely dry. 0.44 wt.-% platinum was determined from the analysis, because the coating with 3.68 g washcoat was not completely dry and still contained water.

The weight of the honeycomb after vacuum drying and the weight of the honeycomb after calcining and the platinum concentration were used to calculate how much platinum must still be coated on the honeycomb for there to be 3.5 g/l platinum on a honeycomb. The platinum quantity which was already on the honeycomb and the washcoat loading after vacuum drying were able to be used to calculate what weight the not completely dry honeycomb vacuum-dried at 80° C. must have at the end in order to have 3.5 g Pt/l honeycomb volume. The honeycombs were then coated up to this weight, with the result that, at the end, each honeycomb had a platinum content of 3.5 g/l honeycomb volume.

3. Calcining of the Vacuum-Dried Honeycombs Under a Gas Mixture which Contained 1 Vol.-% Co in Nitrogen The coated honeycombs were introduced into a quartz glass tube using a ceramic fibre blanket for the sealing. A gas mixture of 1 vol.-% CO in nitrogen was conducted over the catalyst in the calcining unit. In front of the quartz glass tube there was a heater which very quickly heated the gas mixture to up to 490° C. immediately before the honeycomb. Around the quartz glass tube there was an IR oven which was also able to heat up the honeycombs quickly by means of IR radiation.

In this structure, the gas stream of 1 vol.-% CO in nitrogen was heated before the honeycomb from room temperature to 450° C. within 50 s and then further via a PID controller to 490° C. within a further minute. At the same time, a heating-up of the IR oven to 600° C. at 100° C./min was started. A measurement with a thermocouple in the honeycomb produced at the end a temperature of 500° C. in the honeycomb. This temperature was reached after 6 min. Under these conditions, after these 6 min, calcining was continued for another 20 min at a gas inlet temperature of 490° C. and an IR oven temperature of 600° C.

Comparison Example 1

1. Impregnation

The water absorption of an aluminium oxide (Puralox SCF a-140 L3 from Sasol) stabilized with lanthanum was first determined by weighing the powder, slurrying in water, filtering and then weighing again while wet. It was 50.18 wt.-%.

In a planetary mixer, 144.2 g of a 13.87% solution of platinum ethanolamine (ethanolammonium hexahydroxoplatinate) was added slowly dropwise to 400 g of the dry Puralox powder accompanied by stirring. The powder was then dried in the drying oven at 80° C. for 3 hours. The powder was then calcined in a calcining oven in air for 3 h at 500° C. (heat-up rate 2° C./min).

2. Washcoat Production, Coating 140 g of this already calcined powder was topped up to 700 g with water, de-agglomerated with an Ultra-Turrax stirrer and then milled with a bead mill (4000 rpm, 1.2-mm $ZrO_2$ beads).

400-cpsi cordierite honeycombs were coated with this washcoat by immersion and blowing. The honeycombs were then in each case dried again and calcined for 3 h at 500° C.

This coating was repeated until a loading of 70 g washcoat/l honeycomb was reached. As the powder had a platinum content of 5 wt.-%, this meant that the honeycomb also had a platinum content of 3.5 g/l.

Comparison Example 2

1. A Honeycomb Impregnated with Platinum Ethanolamine and Vacuum-Dried was Produced as Described in Example 1

2. Calcining of the Vacuum-Dried Honeycombs Under Air

The coated honeycombs were introduced into a quartz glass tube using a ceramic fibre blanket for the sealing.

In the calcining unit, air was conducted over the catalyst.

In front of the quartz glass tube there was a heater which very quickly heated the air to up to 490° C. immediately before the honeycomb. Around the quartz glass tube there was an IR oven which also heated up the honeycombs quickly by means of IR radiation.

In this structure, the air stream was heated before the honeycomb from room temperature to 450° C. within 50 s and then further via a PID controller to an inlet temperature of 490° C. within a further minute. At the same time, a heating-up of the IR oven to 600° C. at 100° C./min was started. The measurement with a thermocouple in the honeycomb thus produced at the end a temperature of 500° C. in the honeycomb. This temperature was reached after 6 min. Under these conditions, after these 6 min, calcining was continued for another 20 min at a gas inlet temperature of 490° C. and an IR oven temperature of 600° C.

Comparison Example 3

1. A Honeycomb Impregnated with Platinum Ethanolamine and Vacuum-Dried is Produced as Described in Example 1

2. Calcining of the Vacuum-Dried Honeycombs Under 2000 ppm Propylene in Air

The coated honeycombs were introduced into a quartz glass tube using a ceramic fibre blanket for the sealing. The calcining of the vacuum-dried honeycombs took place in a calcining unit with a gas mixture of 2000 ppm propylene in air by conducting the gas stream over the catalyst.

In front of the quartz glass tube there was a heater which very quickly heated the gas mixture to up to 490° C. immediately before the honeycomb. Around the quartz glass tube there was an IR oven which also heated up the honeycombs quickly by means of IR radiation.

In this structure, the gas stream was heated up before the honeycomb from room temperature to 450° C. within 50 s and then further via a PID controller to an inlet temperature of 490° C. within a further minute. At the same time, a heating-up of the IR oven to 600° C. at 100° C./min was started. The measurement with a thermocouple in the honeycomb produced at the end a temperature of 500° C. in the honeycomb. This temperature was reached after 6 min. Under these conditions, after these 6 min, calcining was continued for another 20 min at a gas inlet temperature of 490° C. and an IR oven temperature of 600° C.

Example 4

Comparison Test of the Catalysts

The catalyst honeycombs produced in Example 1 and the comparison examples were tested for the oxidation of CO, propylene and NO in a reactor under the following conditions.

Space Velocity: 70 000 $h^{-1}$

| | | |
|---|---|---|
| CO: | 500 | ppm |
| NO: | 500 | ppm |
| Propylene: | 500 | ppm |
| Oxygen: | 5% | |
| Water: | 10% | |
| $CO_2$: | 70-90 | ppm |
| Nitrogen: | Remainder | |

The gas stream was heated up before the catalyst. For the test, the catalyst was first operated for 30 min under these gas conditions at 390° C. and then cooled down in steps of 10° C. Each temperature was maintained for 8 min and the product gas composition determined between 7 and 8 min. Below 250° C., the cooling down took place in 5° C. steps in order to be able to more precisely determine in particular the CO light-off temperature (50% CO conversion).

FIG. 1 shows the CO conversion of the catalysts used:

It is clear that the catalyst calcined with CO in $N_2$ has the best CO light-off temperature with at the same time a very low NO oxidation (see FIG. 3).

FIG. 2 shows the propylene conversion (a hydrocarbon, HC) of the catalysts used. Here too, the catalyst calcined with CO in nitrogen is very good.

The yield for the oxidation of NO to $NO_2$ is represented in FIG. 3. It is clear that not only is the catalyst which was calcined with CO in nitrogen better for an oxidation reaction, but the catalyst surprisingly oxidizes much less NO to toxic $NO_2$ under the same conditions in the same test.

In all ranges, the catalyst calcined with propylene in air is at least better than the catalysts calcined only in air.

The invention claimed is:

1. A method for producing a catalyst, comprising the steps:

a) impregnating a metal oxide support material with a platinum compound, b) drying the impregnated metal oxide support material obtained in step a) at a temperature of from 60 to 100° C., c) applying the dried, impregnated metal oxide support material obtained in step b) as a washcoat coating to a catalyst support body which is then dried at a temperature of from 60 to 100° C., and d) calcining the dried catalyst support body obtained in step c) that has not undergone any prior calcining, in a gas stream which consists of CO and inert gas.

2. The method according to claim 1, wherein in step d) a first calcining takes place heating up within 10 minutes and a second calcining takes place within from 10 to 40 minutes under identical calcining conditions.

3. The method according to claim 1, wherein the gas stream contains 0.5 to 3 vol-% CO and 97 to 99.5 vol-% inert gas.

4. The method according to claim 1, wherein $N_2$, He, Ne or argon is used as inert gas.

5. The method according to claim 1, wherein the calcining takes place at a temperature of from 400 to 650° C.

6. The method according to claim 1, wherein a metallic or ceramic monolith, a non-woven or a metal form is used as catalyst support body.

7. The method according to claim 1, wherein the metal oxide is selected from the group consisting of aluminum oxide, silicon oxide, aluminosilicate, zirconium oxide, titanium oxide, Al/Si mixed oxide or combinations thereof.

8. The method according to claim 4, wherein $N_2$ is used as inert gas.

9. A method for producing a catalyst, consisting of the steps of:

a) impregnating a metal oxide support material with a platinum compound, b) drying the impregnated metal oxide support material obtained in step a) at a temperature of from 60 to 100° C., c) applying the dried, impregnated metal oxide support material obtained in step b) as in the form of a washcoat coating to a catalyst support body which is then dried at a temperature of from 60 to 100° C., and d) calcining the dried catalyst support body obtained in step c) in a gas stream which consists of CO and inert gas.

10. The method according to claim 9, wherein in step d) a first calcining takes place heating up within 10 minutes and a second calcining takes place within from 10 to 40 minutes under identical calcining conditions.

11. The method according to claim 9, wherein the gas stream contains 0.5 to 3 vol-% CO and 97 to 99.5 vol-% inert gas.

12. The method according to claim 9, wherein the calcining takes place at a temperature of from 400 to 650° C.

13. The method according to claim 9, wherein a metallic or ceramic monolith, a non-woven or a metal form is used as catalyst support body.

14. The method according to claim 9, wherein the metal oxide is selected from the group consisting of aluminum oxide, silicon oxide, aluminosilicate, zirconium oxide, titanium oxide, Al/Si mixed oxide or combinations thereof.

* * * * *